United States Patent [19]
Kaufman

[11] Patent Number: 5,535,688
[45] Date of Patent: Jul. 16, 1996

[54] TOOL BAR PLANTER SYSTEM FOR COMBINES

[76] Inventor: Michael J. Kaufman, 13853 Road J, Ottawa, Ohio 45875

[21] Appl. No.: 361,294

[22] Filed: Dec. 22, 1994

[51] Int. Cl.$^6$ ............................ A01D 45/00; B60K 17/28
[52] U.S. Cl. ............................ 111/52; 172/456; 172/474
[58] Field of Search .................................. 172/474, 456; 111/52

[56] References Cited

U.S. PATENT DOCUMENTS

| | | |
|---|---|---|
| 2,655,854 | 10/1953 | Warne ................................ 172/474 X |
| 3,106,254 | 10/1963 | Clark ...................................... 172/474 |
| 3,465,832 | 9/1969 | De Larm ............................. 172/474 X |
| 3,662,525 | 5/1972 | White . |
| 3,974,837 | 8/1976 | Applegate . |
| 3,982,773 | 9/1976 | Stufflebeam et al. . |
| 4,117,893 | 10/1978 | Kinzenbaw . |
| 4,137,852 | 2/1979 | Pratt . |
| 4,197,691 | 4/1980 | Woodruff . |
| 4,286,530 | 9/1981 | Conley . |
| 4,312,621 | 1/1982 | Quanbeck et al. . |
| 4,333,534 | 6/1982 | Swanson et al. . |
| 4,368,003 | 1/1982 | MacDonald . |
| 4,425,857 | 1/1984 | Lienemann et al. . |
| 4,461,356 | 7/1984 | Larson . |
| 4,525,988 | 7/1985 | Harlan . |
| 4,529,040 | 7/1985 | Grollimund . |
| 4,624,196 | 11/1986 | Anderson . |
| 4,624,197 | 11/1986 | Drake . |
| 4,648,334 | 3/1987 | Kinzenbaw . |
| 4,723,787 | 2/1988 | Hadley et al. ....................... 172/456 X |
| 4,771,713 | 9/1988 | Kinzebaw . |
| 4,945,997 | 8/1990 | Adee . |
| 5,088,563 | 2/1992 | Shidler ..................................... 172/456 |
| 5,113,956 | 5/1992 | Friesen et al. . |
| 5,203,738 | 4/1993 | Busse . |
| 5,291,954 | 3/1994 | Kirwan . |
| 5,303,662 | 4/1994 | Drake . |

Primary Examiner—Terry Lee Melius
Assistant Examiner—Christopher J. Novosad
Attorney, Agent, or Firm—Marshall & Melhorn

[57] ABSTRACT

An apparatus for adapting a tool bar planting system to the front of an agricultural combine. The tool bar is secured to the front framework of the combine after the grain head has been removed. The tool bar includes folding extension arms that allow for various planting and transporting configurations. Planter seed units are attached to the tool bar and the extension units to complete the planting system. Seeds for the planter seed units are stored in the grain storage bin on the combine and delivered to the individual planter seed units by an air conveying system.

16 Claims, 5 Drawing Sheets

TOOL BAR PLANTER SYSTEM FOR COMBINES

BACKGROUND OF THE INVENTION

1. Field of the Invention

This invention relates to a tool bar attachment for agricultural combines and more particularly to a folding tool bar for adapting a planting system to agricultural combines. The folding tool bar attaches to the front of the combine and permits various planting and transporting configurations.

2. Summary of Related Art

An agricultural combine is one of the most expensive pieces of equipment owned by a farmer. The combine is designed primarily for harvesting wheat, beans, corn, and other grains. Although the combine is absolutely essential for harvesting grain, the utilization factor for a combine is quite low if combine use is limited to a few weeks per year for harvesting.

Therefore, it is desirable to utilize this expensive asset for additional agricultural uses other than harvesting. Planting is an ideal area where the combine can be effectively utilized outside of harvesting. A planter attachment for a combine presents an opportunity to use the combine at a time when it normally sits idle. An effective planting attachment for a combine must provide various planting row spacing arrays. It must also be at least as convenient to use as a conventional tractor drawn planting system.

The utilization of a combine for planting has been suggested in the prior art. Additionally, the concept of using a folding tool bar on planting systems is suggested. However, the use of a folding tool bar on combines is not disclosed.

U.S. Pat. No. 4,525,988 to Harlan discloses a planter implement for mounting on the front of a combine. The tool bar is attached to the cutter head attachment on the throat of the combine. The planter implement is interposed between the throat and the cutter means. The tool bar has three segments. A center bar is mounted to the throat of the combine and side bars extend from both ends of the center bar. The implement is designed to use while harvesting so that as one crop is harvested, a new crop is being planted. The discharge of the combine then provides ground cover for the planted seeds.

The attachment of the planting device disclosed in Harlan involves a segmented tool bar connected to the cutter attachment on the throat of the combine. The throat on combines is flexible in order to harvest uneven ground. Attaching a heavy apparatus to the throat could seriously damage the throat and render the combine inoperable. The tool bar claimed in Harlan is also limited to a narrow path that is roughly the width of the combine.

Additionally, the planter in Harlan was designed for simultaneously harvesting one crop while planting another. Therefore, the storage bin on the combine holds the harvested crop and not the seed for planting. This causes additional stops in the field for unloading the harvested crops and loading additional seed into the planting units.

U.S. Pat. No. 5,291,954 to Kirwan discloses a front mounted tool carrier bar. The bar is connected to the front of the tractor and pushed by the tractor. The tool bar is front folding to facilitate transportation of the planting unit to and from the field. The tool bar makes up a push planting unit that has a self supported frame with ground engaging wheels.

It would be advantageous to have a tool bar for attaching a planting system to the front of a combine in order to provide additional uses for the combine other than harvesting. It would also be advantageous to have a tool bar for a combine that has various planting and transporting arrays. Additionally, it would be advantageous to utilize the grain storage bin on the combine for holding seeds for planting thereby eliminating the inefficiencies associated with smaller seed storage capacities.

SUMMARY OF THE INVENTION

In accordance with the present invention, there is provided a tool bar for adapting a planting system to the front of a combine. The tool bar is secured to the front of the combine after the grain head has been removed. The tool bar is fully supported by the combine and does not require ground engaging wheels for additional support. Planter seed units are attached to the tool bar to complete the planting system.

The planting system provides an additional use for the combine other than harvesting. It also allows for the optional use of the large storage bin on the combine. Utilization of the storage bin improves the efficiency of the planting operation by eliminating frequent stops in the field to reload the planters with seed. Additionally, the tool bar can have extension arms that are capable of moving into different planting and transporting configurations.

The planting implement consists of a tool bar frame which is transversely mounted to the front of the combine. An upper mounting support is pivotly connected to the tool bar frame and the combine while lower mounting members on the tool bar frame are hydraulicly connected to the combine. The hydraulics serve to raise or lower the planter seed units to and from the ground through the rotation of the tool bar about the central pivot point.

The planter seed units extend downward from the tool bar frame to engage the ground. The planter seed units are spaced at specific distances in order to provide appropriate row spacings for various crops. Seeds are then delivered to the planter seed units from a larger storage bin. The grain storage bin on the combine may be utilized to store the seeds for planting. Alternatively, an auxiliary hopper can be installed onto the tool bar frame for seed storage. The seeds are then delivered mechanically or pneumatically from the storage bin or hopper to the individual seed units for planting.

Extension arms optionally installed onto the tool bar frame provide various planting and transporting arrays. Planter seed units are attached to at least one of the extension arms. The extension arms are capable of positioning the attached planter seed units in either a wide planting pattern or a narrow planting pattern. Additionally, the narrow pattern is used to transport the combine to and from the field.

The objective of the present invention is to create an additional use for the agricultural combine. The combine is an expensive asset that is presently used only during the harvesting season. The addition of a tool bar on the front of the combine allows for the attachment of planter seed units. The combine then can be utilized for planting and is therefore not reserved solely for harvesting.

A further objective of the present invention is to utilize the large storage capacity of the grain storage bin for holding seeds for planting. The use of the large capacity in the storage bin improves the efficiency of the planter system by eliminating frequent stops in the field to fill planter seed units. The large storage capacity also allows the farmer to purchase seeds in bulk versus bags. Bulk material is less costly than bags and improves the overall efficiency of the planting operation by reducing the handling requirements associated with individual bags.

Another objective is to provide a tool bar with articulating extension arms. The arms provide various planting arrays required for different crops. They also allow the apparatus to fold in for ease in transportation.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Referring now more particularly to the drawings, there is illustrated in FIGS. 1–7 a combine 10 having a tool bar planting system 30 mounted to the front of the combine 10 in place of a detachable grain head (not shown). The tool bar planting system 30 is a push-driven planting implement that provides an additional use for the combine 10 other than harvesting crops.

Figure 1:
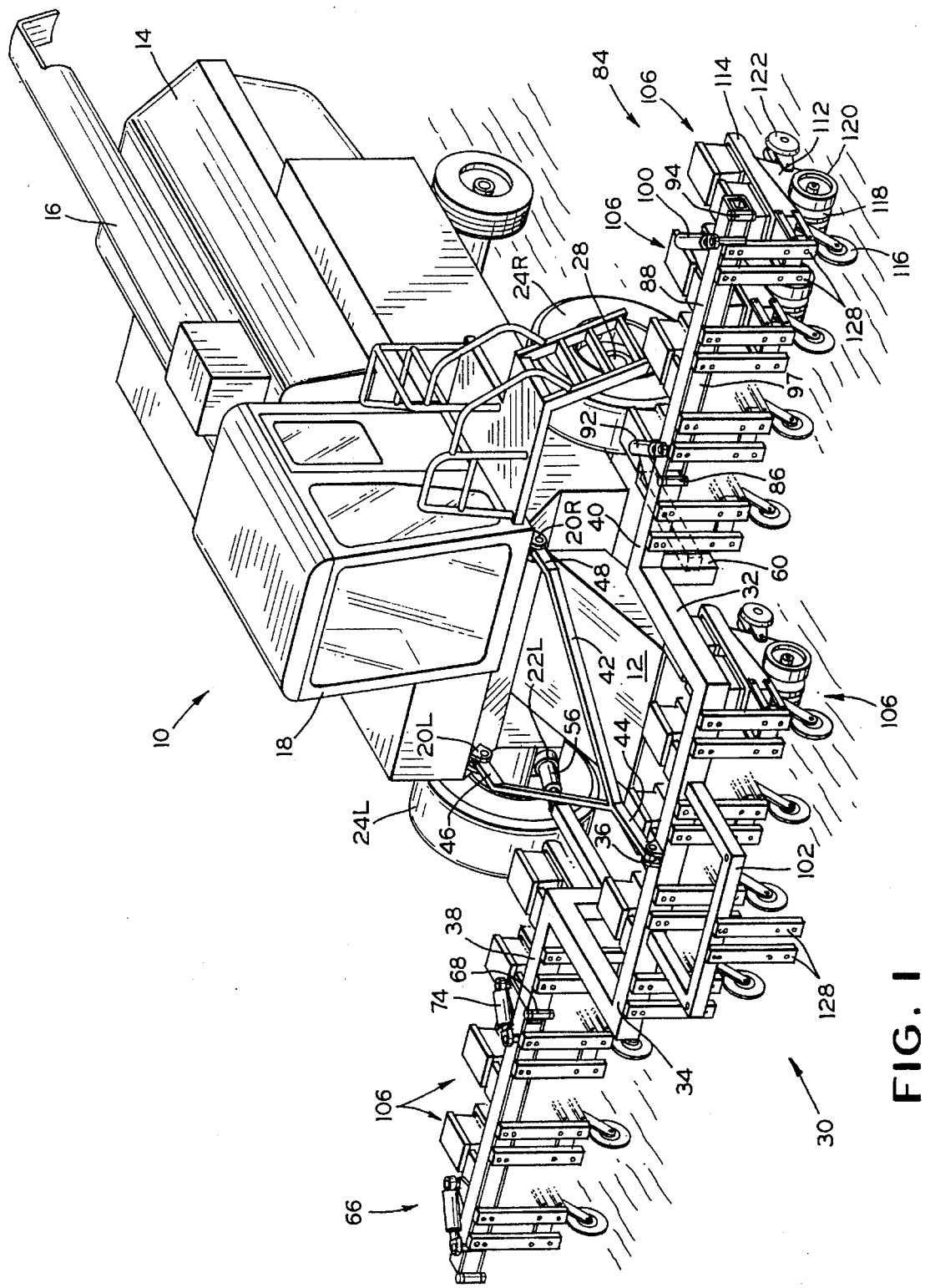
FIG. 1 is a isometric view of the tool bar as it is mounted to the combine and used in the field.
Figure 2:
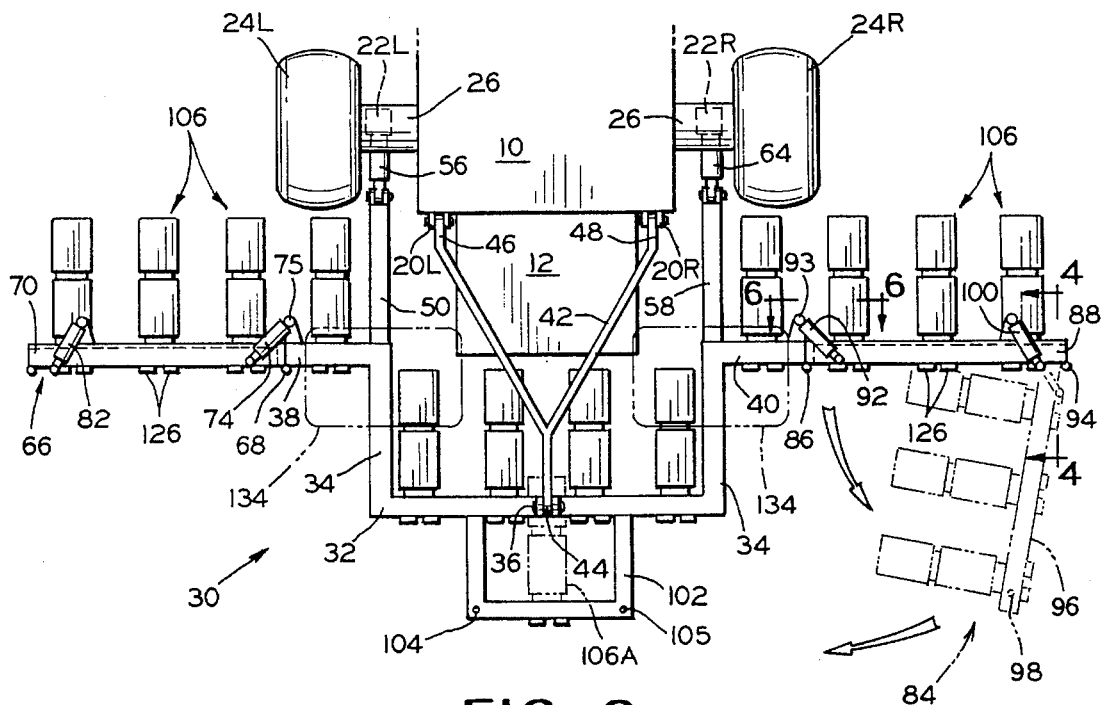
FIG. 2 is a top elevational view of the tool bar planting system connected to a combine while the planter system is in a thirty inch row planting pattern. The phantom figures indicate the attachment of the optional thirteenth planter seed unit and the motion of the extension arms as they move into the narrow planting or transporting array.
Figure 3:
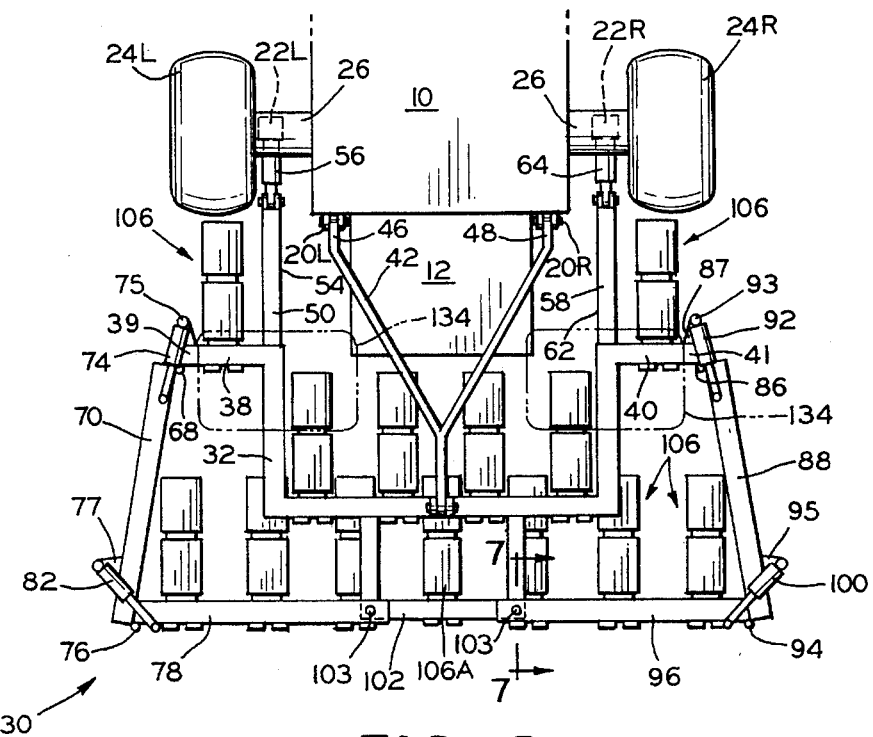
FIG. 3 is a top elevational view of the tool bar planter system in a narrow fifteen inch row planting pattern with the optional thirteenth planter seed unit attached to the extension frame.

In FIGS. 1,2, and 3, the combine 10 is a standard combine produced by one of several full line combine manufacturers. The combine 10 has a throat 12 exposed between the front drive tires 24R, 24L where the grain head would otherwise attach. A grain storage bin 14 and a grain unloading arm 16 are located to the rear of the combine 10 behind the cab 18. The combine throat 12 during the harvesting operation conveys harvested products into the grain storage bin 14. The throat 12 is not utilized with the present invention. However, it remains on the combine 10 and must be considered when mounting a tool bar planting system 30 to the front of the combine 10.

A few modifications to the combine 10 are required in order to attach the tool bar planting system 30. Pivoted mounting connections 20R, 20L are integrally attached to the framework on the front of the combine 10 near the cab 18. Additionally, lower member mounting connections 22R, 22L are integrally attached to the combine frame 26 near the front axle 28.

The tool bar planting system 30 includes a tool bar frame 32, an upper mounting member 42, lower mounting members 50, 58, extension arms 66, 84, an extension frame 102, and planter seed units 106.

The tool bar frame 32 is a longitudinal box frame designed to hold a plurality of planter seed units 106. The tool bar frame 32 is designed to extend forward and away from the combine throat 12. In the present invention, the tool bar frame 32 includes a U-shaped center tool bar 34 that extends outward and away from the combine throat 12 as shown in FIG. 2. A pair of side tool bars 38,40 extend perpendicular from each end of the center tool bar. The side tool bars create opposing ends 39,41 of the tool bar frame 32.

The tool bar frame 32 is transversely mounted across the front of the combine 10. There are three connecting points between the combine 10 and the tool bar planting system 30. The connecting point on top of the tool bar frame 28 is at a centrally positioned pivoted connection 36. Two lower mounting members 50,58 connect to the base frame 32 from underneath. Each lower mounting member 50,58 is positioned on opposing sides from the central pivoted connection 36 at equal distances. The tool bar frame 32, when mounted onto the combine 10, extends away from the front of the combine and is positioned at a height of approximately 4.5 to 6 feet from ground level.

The upper mounting member 42 is an integrally formed box frame. The member has opposing ends with one end having a single connecting point 44. The other end is split to form two connecting points 46,48. All three connecting points 44,46,48 are pivotly coupled or hinged to the tool bar frame 32 and the combine 10. The single connecting point pivotly 44 attaches to the tool bar frame 32. The opposing end with two connecting points 46,48 attaches to the combine 10 at two locations near the cab 18.

The lower mounting members 50,58 are integrally attached to the bottom of the tool bar frame 32. The lower mounting members 50,58 have a vertical section 52,60 that connects to the tool bar frame 32. A lower horizontal section 54,62 extends from the vertical section back 52,60 to the combine 10. Hydraulic rams 56,64 are pivotly connected to the end of each horizontal section 54,62. Each hydraulic ram 56,64 is coupled to the combine frame 26 at lower mounting connections 22L,22R. The hydraulic rams 56,64 are connected and activated through the hydraulic system on the combine 10. The connection of each ram at the combine frame 26 could embody a quick connect coupling so that the tool bar system 30 is easily mounted onto the combine 10.

Alternatively, the lower mounting members 50,58 could connect to the hydraulic rams (not shown) on the combine throat 12. This would require detaching the extension end of those rams from the throat and securing the throat to prevent movement while operating the tool bar planting system 30. The extension ends could then connect to the lower mounting members 50,58. This option is dependent upon the full line combine manufacturers as present hydraulics rams on combine throats are not strong enough to support the tool bar planting system 30. Therefore, an upgrading of the throat hydraulics would be required.

There are several options available to provide different planting configurations. The tool bar frame 32 could be made wider in order to handle up to twenty four planter seed units 106 at fifteen inch row spacings. In this configuration alternating planter seed units could be raised off of the ground to provide a thirty row spacing planter. However, such a wide tool bar frame would make transportation to and from the field very difficult. Therefore, the present invention utilizes folding extension arms 66,84 to provide a narrow planting and transporting configuration.

Figure 4:
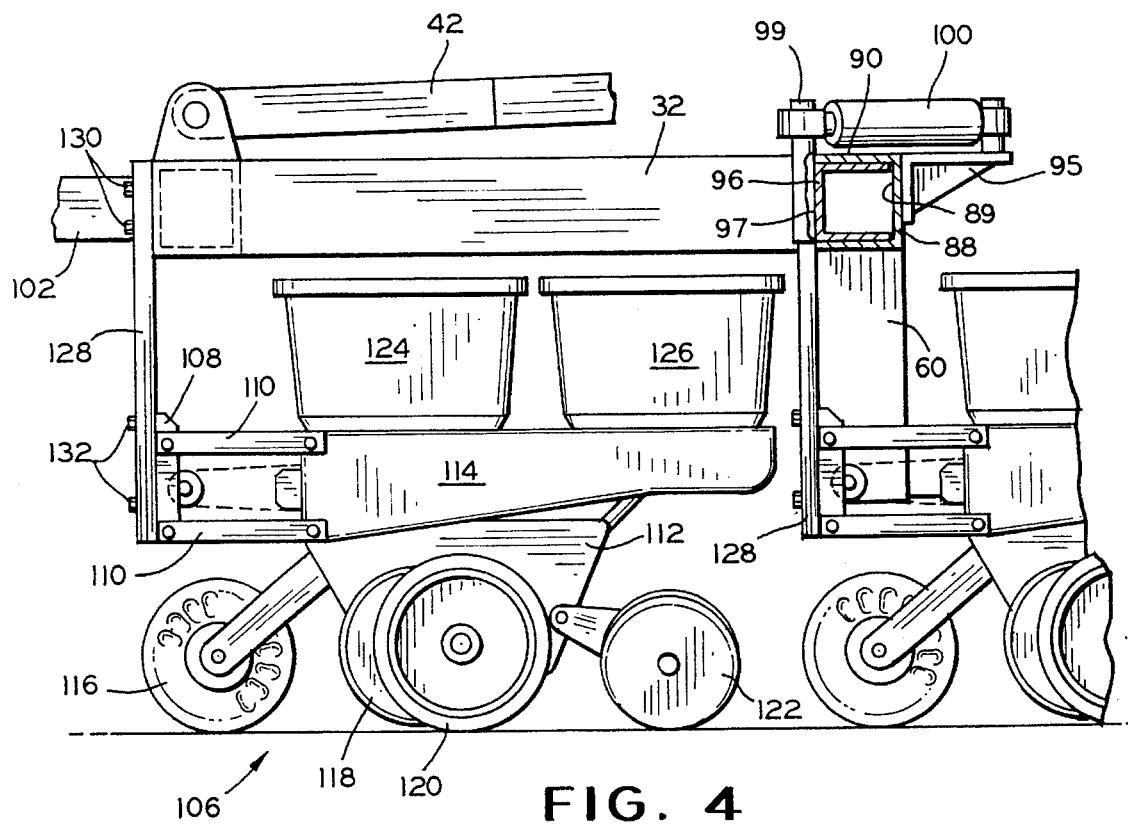
FIG. 4 is a fragmentary vertical section taken substantially along line 4—4 of FIG. 2.

The extension arms 66,84 in the present invention are attached to opposing ends 39,41 of the tool bar frame 32 by hinged or pivoted connectors 68,86. Each extension arm 66,84 is made up of a first arm 70,88 and a second arm 78,96. The first and second arms are attached together by a hinged connector 76,94. The first and second arms are made from open channel frames with the first arm channel frame being larger the second arm. The second arm 78,96 therefore fits into the open channel 71,89 of the first arm as illustrated in FIG. 4. The closed face 79,97 of the second arms 79,97 faces outward away from the open channel 71,89 of the first arms. The closed face 79,97 of each second arm 78,96 is used for mounting planter seed units.

Figure 6:
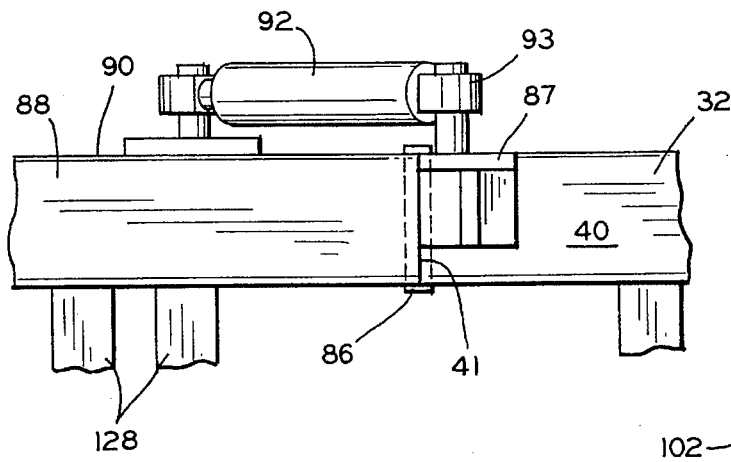
FIG. 6 is a fragmentary vertical section taken substantially along 6—6 of FIG. 2.

FIG. 6 shows the extension arms 66,84 connected to the tool bar frame 32. Hydraulic rams 74,92 are connected to the first extension arms 70,88 at each of the opposing ends 39,41 of the tool bar frame 32. The stationary section 75,93 of each hydraulic ram 74,92 is mounted to a bracket 69,87 on the tool bar frame 32. The other end of the hydraulic ram 74,92 is connected to the top channel 72,90 of the first arm 70,88. When activated, the hydraulic ram 74,92 extends outward thereby swinging the first arm 70,88 forward about the hinged connection 68,86.

FIG. 4 shows a second hydraulic ram 100 on the extension arm 84. The ram 100 is fixed on a bracket 95 mounted to the first extension arm 88. The hydraulic ram 100 is used to rotate the second extension arm 96 away from the first extension arm 88 about the hinged connection 94. The ram 100 is connected to a rod 99 fixed to the closed face 97 of the second extension arm 96. When de-activated the hydraulic ram 100 forces the second arm 96 into the open channel 89 of the first extension arm 88. The opposing extension arm 66 operates in the same manner with ram 82, bracket 77, first extension arm 70, second extension arm 78, closed face 79, and open channel 71. The hydraulic rams 74,82,92,100 are connected to the hydraulic system of the combine 10. The rams 74,82,92,100 are operated from the cab 18 of the combine 10.

An extension frame 102 is required with the present invention. The extension frame 102 provides support for each second extension arm 78,96 when they are in the narrow configuration. The extension frame 102 is integrally attached to the tool bar frame 32 in a forward extending position. The extension frame 102 is centrally positioned about the tool bar frame 32 and provides support for an optional planter seed unit 106A in order to complete a narrow row planting configuration. The extension frame 102 is a smaller box frame than the tool bar frame 32. This is necessary because the second arm 78,96 must fit over the extension frame 102 to complete the narrow planting configuration. The extension frame 102 and the second extension arms 78,96 each have apertures 104,105 and 80,98 extending through the box frames. The apertures are used in securing the second arms 78,96 to the extension frame 102 through the use of a securing pin 103.

Planter seed units 106 are attached to the tool bar frame 32, the second extension arms 78,96, and the extension frame 102. FIG. 4 is a side elevational view of a typical planter seed unit 106 attached to the tool bar planting system 30. The planter seed units 106 can be provided by one of several manufacturers. A mounting plate 108 is connected to mounting brackets 110. The mounting brackets 110 attach to a support plate 112 and hopper bracket 114. A coulter 116 is attached to the front of the support plate 112. Following the coulter 116 is the furrowing disc 118 and the gauge wheels 120. The seeding tube (not shown) is located between the gauge wheels 120. Closing wheels 122 are attached to the rear of the planter seed unit 106. FIGS. 4 show two hoppers 124,126 attached to the hopper bracket 114. The first hopper 124 is for seeds and the second hopper 126 is for herbicide. The seeds for planting are dispensed through a tube (not shown) placed between the gauge wheels 120. Herbicide is dispensed through a tube (not shown) during the planting operation. Other known methods for adapting disc furrowers, levelers, and residue wheels to the planter seed units 106 for various field conditions are applicable and do not represent features of the present invention.

The planter seed units 106 are connected to the frames 32,102 and the extension arms 78,96 by vertical frame members 128. Vertical frame members 128 are box frame members that are bolted onto the frames 32,102 and the extension arms 78,96 by bolts 130. The vertical frame members 128 extend downward and attach to the mounting plate 108 of the planter seed unit 106. FIGS. 1 and 4 indicate the vertical frame members 128. Two box frames are illustrated in the figures. However, single frame members will also support the planter seed units 106. FIG. 4 indicates the planter seed units 106 connected to the lower end of the vertical frame members 128 by bolts 132. The vertical frame members 128 are approximately eighteen to thirty six inches in length. The length of the vertical frame member 128 is dependent upon the height of the tool bar frame 32 from the ground and the dimensions of the planter seed units 102.

The materials of construction for the rigid tool bar frame 32, mounting members 42,50,58, and extension arms 66,84 can be carbon steel or any metal or metal alloy. The material must be strong enough to support the planter seed units 106 with out any deformation, bending, or failure to the frame or mounting members.

There are several means for delivering seeds to the individual planter seed units 106. One form of delivering seeds to the individual planter seed units 106 involves manually feeding each seed hopper. This form is typically used with ground driven plate style planters. Plate style planters use a ground engaging wheel to operate a mechanical metering unit. This mode of operation requires frequent stops in the field to refill hoppers.

Figure 5:
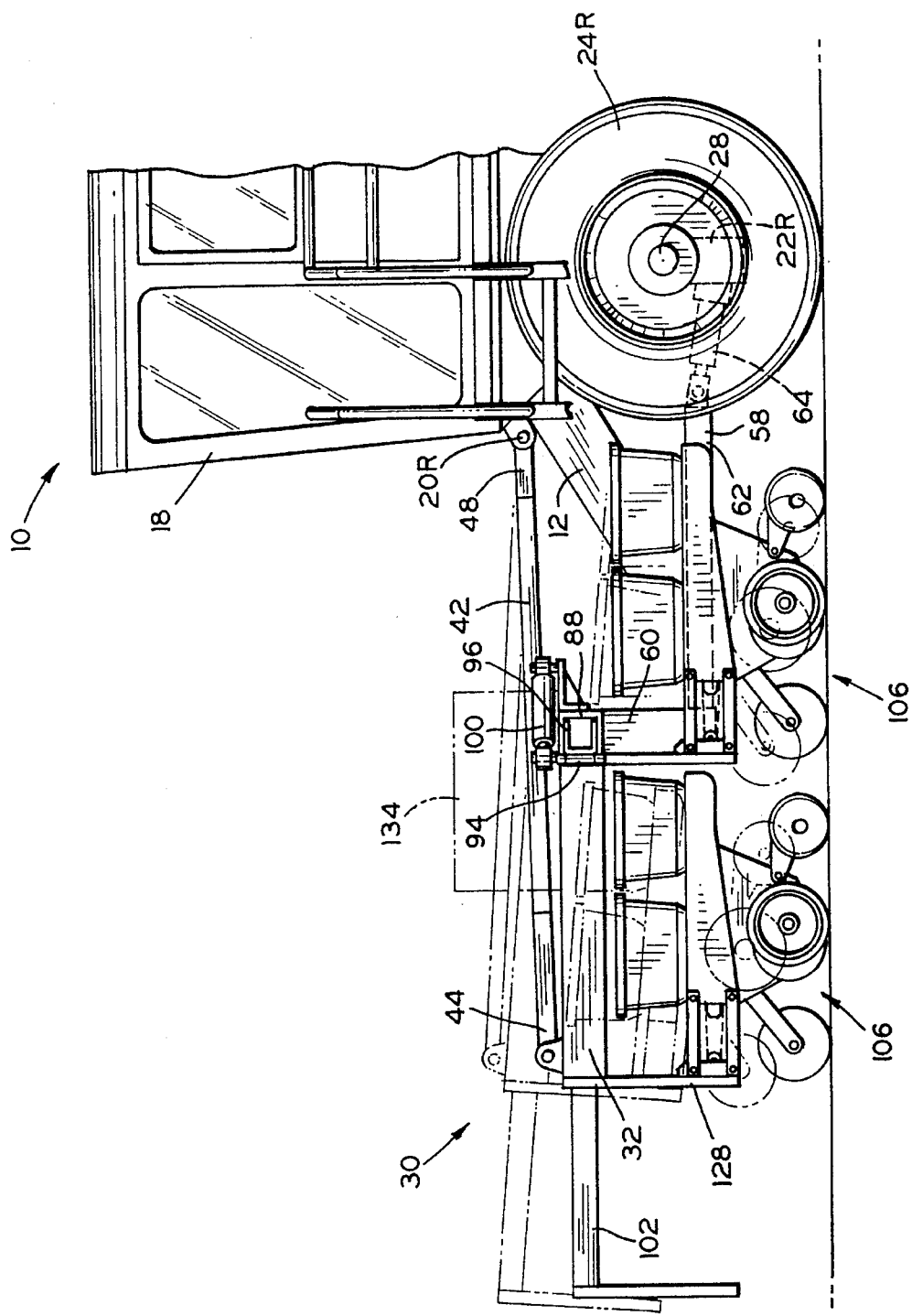
FIG. 5 is a side elevational view of the front of the combine with the tool bar attached. The phantom view indicates the movement of the tool bar planting system as it is raised up for transporting or movement of the extension arms.

An additional means for delivering seeds to the individual planter seed units is through the use of one or more large hoppers 134 placed onto the top of the tool bar frame 32 as indicated in phantom in FIGS. 2,3 and 5. The seeds in the hopper 134 are then distributed through an air delivery system to each of the seed hoppers 124. The air delivery system can also deliver seeds directly to the planting tubes without using the smaller seed hoppers 124. The large hoppers 134 are filed manually with individual bags of seed.

An alternative means for delivering seeds to the planter seed units 102 is to utilize the large grain storage bin 14 on the combine 10. The large grain storage bin 14 allows the procurement of seeds in bulk form and thereby reduces overall costs to the farmer. Additionally the farmer makes fewer stops in the field therefore, overall planting efficiency is improved. An air delivery system is used as with the large hopper. The seeds can then be conveyed either to the large hopper 134 or directly to the individual planter seed units 102.

Figure 8:
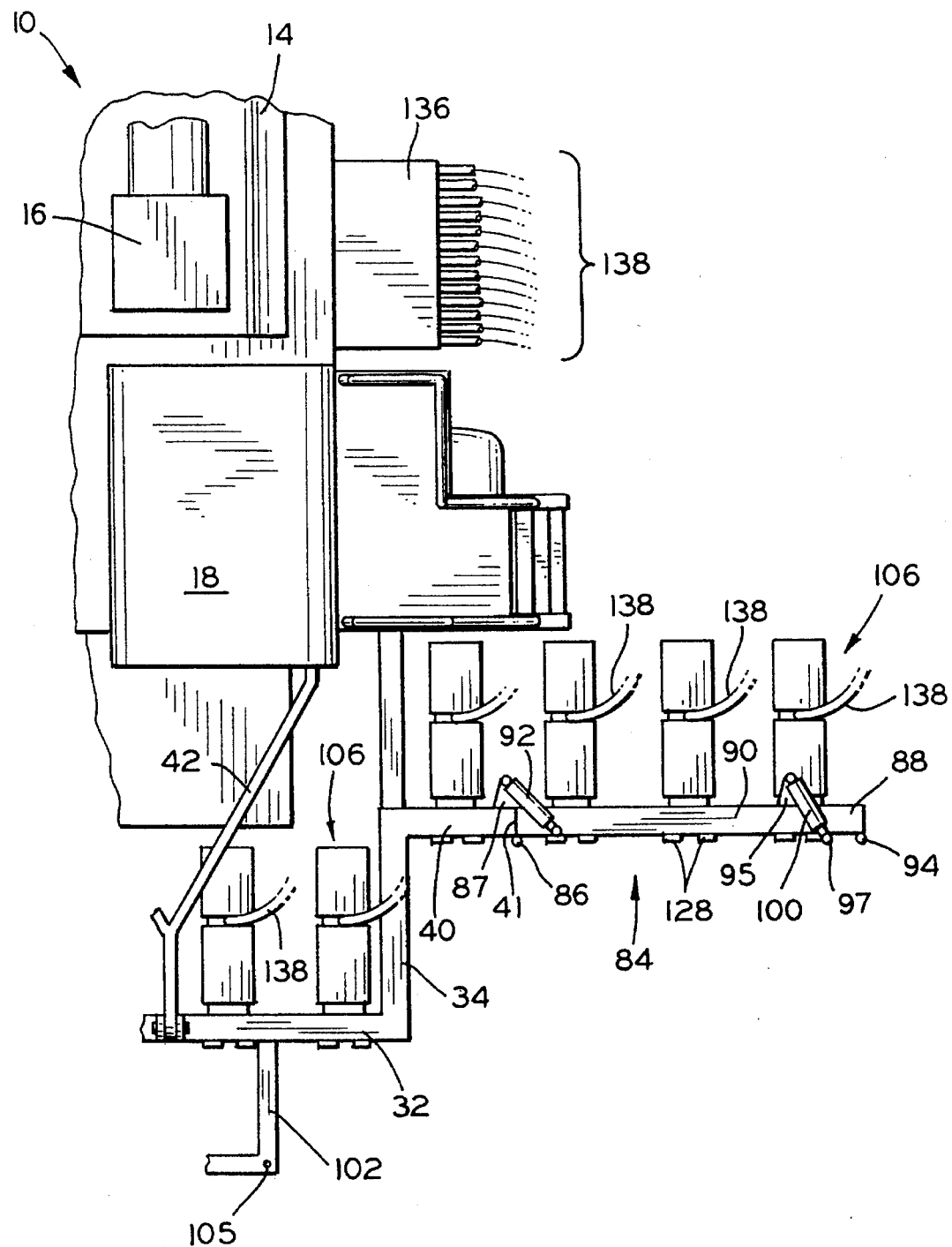
FIG. 8 is a fragmentary top elevational view of the air delivery system with the hoses to the individual planter seed units.

FIG. 8 illustrates the use of an air delivery system 136 for delivering seed from the grain storage bin 14. Air delivery systems 136 are known in the prior art and can be supplied by several manufacturers. The air system 136 delivers the seed through hoses 138 which then can go directly to the planter seed units 102.

Alternatively, the grain unloading arm 16 could be utilized in removing seed from the grain storage bin 14 and intermittently feeding a large hopper 134 on the tool bar frame 32. However, most grain unloading arms have a limited range of motion which does not presently include a position forward of the cab 18. Therefore, modifications to the unloading arm 16 would be required in order to exercise this alternative.

Having set forth a description of the structure of the present invention, the use and function of the tool bar planting system may now be described with particular reference to FIGS. 2,3,5, and 7. The initial preparation for the mounting of the tool bar planting system 30 requires that the detachable grain head from the front of the combine 10 is removed and the tool bar system 30 is prepared with the appropriate planter seed units 102 in place.

The combine 10 approaches the tool bar planting system 30 so that the lower mounting members 50,58 are positioned directly below the combine axle 28 and the combine frame 26. The hydraulic rams 56,64 on the lower mounting members 50,58 are then connected to the combine 10 at the lower mounting connection 22R,22L. The hydraulic rams 56,64 are then connected to the combines hydraulic system.

The upper mounting member 42 is then attached to complete the connections of the tool bar planting system 30 to the combine 10. The upper mounting member 42 is pivotly connected to the tool bar frame 32. The opposing end of the upper mounting member 42 with the two pivot connections 46,48 is then lifted into position so that the two pivoted connections can be made. Depending upon the combine model, the tool bar frame 32 will rest approximately 4.5 to 6.0 feet off of the ground. It is necessary to have the tool bar frame 32 at this height in order to allow the movement of the extension arms 66,84 and corresponding planter seed units 106.

Upon completion of all mounting connections, the hydraulic rams 56,64 for the lower mounting units 50,58 and the extension arms 66,84 are then connected to the combines hydraulic system. The hydraulics are operated from the cab 18 of the combine 10.

FIG. 5 illustrates the use of the hydraulic rams 56,64 on the lower mounting members 50,58. Activating the hydraulic rams 56,64 on the lower mounting members 50,58 forces the tool bar frame 32 upward in a pivoting motion about the central pivot connection 36 at the tool bar frame 32 and upper mounting member connection 42. The upward pivoting motion lifts all of the planter seed units 106 off of the ground. The motion of the tool bar planting system 30 is shown in phantom in FIG. 5. It is from this raised position that the tool bar system 30 may be transported and the extension arms 66,84 moved into the different planting positions.

The movement of the extension arms 66,84 is illustrated in FIGS. 2 and 3. From a raised position with all planter seed units 106 off of the ground, the extension arms 66,84 can be placed in either a twelve row planting pattern with thirty inch row spacings as shown in FIG. 2, or into a thirteen row pattern with fifteen inch row spacings as shown in FIG. 3. The thirteenth unit 106A is added to the extension frame 102 in the narrow configuration to provide a complete fifteen inch row spacing pattern.

The wide planting pattern in FIG. 2 is accomplished by retracting the second extension arm 78,96 into the channel 71,89 of the first extension arm 70,88 when the first extension arms 70,88 are deactivated. The planter seed units 106 attached to the closed face 79,97 of the second arms 78,96 are in line with the planter seed units 106 attached to the opposing ends 39,41 of the tool bar frame 32. All of the planter seed units 106 are then positioned to provide thirty inch row planting patterns.

Figure 7:
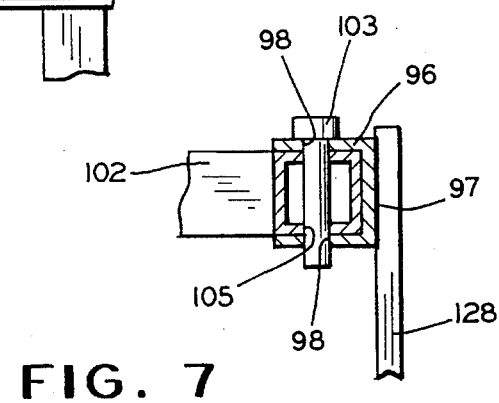
FIG. 7 is a fragmentary vertical section taken substantially along line 7—7 of FIG. 3.

The tool bar planting system 30 can be put into the narrow planting or transporting position when all planter seed units 106 are lifted off of the ground. FIG. 2 indicates the movement of the extensions arms 66,84. The second extension arm 78,96 is moved out from within the channel 71,89 of the first extension arm 70,88 about the hinge 76,94 by the hydraulic ram 82,100. The second arm 78,96 rotates about the hinge 76,94 to an acute angle from the first extension arm 70,88. The first extension arm 70,88 then moves forward about the hinge 68,86 through the extension of the activated hydraulic ram 74,92. The movement of the first extension arms 70,88 about the hinge 68,76 causes each of the second arms 78,96 to swing toward the extension frame 102. The first arms 70,88 continue to rotate at an acute angle from the tool bar frame until the ends of the second arms 78,96 fit over the extension frame 102. In FIG. 7, the second arms are locked into place about the extension frame by placing a locking pin 103 through the apertures 80,98 of the second arms 78,96 and the apertures 104,105 of the extension frame 102. FIG. 3 shows the narrow planting and transporting configuration.

In operation, one of the planting arrays is selected and the grain storage bin 14 is filled with seeds for planting. The tool bar planting system 30 is lowered to the ground by deactivating the hydraulic rams 56,64 on the lower mounting units 50,58. As the tool bar planting system 30 is pushed forward by the combine 10, the air delivery system sends seeds to the individual planter seed units for sowing. The small hoppers 124,126 on the individual planter seed units then provide the option of delivering herbicide, fertilizer, or both.

Adjustments can be made on the individual planter seed units 106 for various planting conditions such as tilled or non-tilled soil. Additionally, adjustments to the drive tires 24R,24L of the combine 10 can be made in order to prevent damage to the freshly planted seed zone. The tires 24R,24L can either be wider than normal drive tires for flotation over the seed zone or the lugs can be cut out of the tires so that there is no footprint over the seed zone.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A push-driven planting implement for mounting onto the front of a combine in place of a detachable grain head, the combine including a frame and a throat portion extending forward of the frame, said planting implement comprising:

(a) a tool bar frame;

(b) a mounting system connected to the tool bar frame for mounting said tool bar frame on a combine frame of a combine, said tool bar frame being positioned forwardly of and spaced-apart from a throat of the combine; and (c) a plurality of planter seed units mounted onto said tool bar frame.

2. A planting implement as recited in claim 1, including means for delivering seeds mounted on said tool bar frame and connected to said planter seed units.

3. A planting implement as recited in claim 2, wherein said means for delivering seeds includes a means for conveying seed from a grain storage bin on the combine to the planter seed units.

4. A planting implement as recited in claim 3, wherein said means for conveying seeds to said planter units is an air conveying system.

5. A planting implement as recited in claim 3, wherein said means for conveying seeds to said planter units is a mechanical conveying system.

6. A planting implement as recited in claim 2, wherein said means for delivering seeds includes a large hopper mounted on said tool bar frame and means for conveying seed to the planter seed units from said large hopper.

7. A planting implement as recited in claim 1, wherein said mounting system includes an upper mounting member with opposing ends, one end of said mounting member pivotly connected to said tool bar frame, the other end of said mounting member pivotly connected to the combine frame.

8. A planting implement as recited in claim 1, wherein said mounting system includes a pair of lower mounting members and a hydraulic positioning system, said lower mounting members extending from said tool bar frame to the hydraulic positioning system mounted on the combine frame so that the hydraulic positioning system when activated or deactivated raises or lowers said tool bar frame and the planter seed units.

9. A planting implement as recited in claim 1, said planting implement including:

(a) a pair of folding extension units pivotly mounted on opposite ends of the tool bar frame, said folding units each having a first arm pivotly attached to a second arm;

(b) a plurality of planter seed units mounted on the second arm of said folding extension units; and (c) means for articulating the first and second arms of said folding units into a wide planting array so that the first arm extends outward in a linear fashion from the ends of said tool bar frame with the second arm fully retracted against and parallel with the first arm, and into a narrow planting or transporting array so that the second arm is positioned at an acute angle with the first arm and the first arm is moved inward at an acute angle with the tool bar frame.

10. A planting implement as recited in claim 1, wherein said tool bar frame includes a U-shaped center tool bar for positioning around the throat of said combine and a pair of side tool bars extending perpendicular from each end of the center tool bar, said side tool bars forming opposing ends of said tool bar frame.

11. A planting implement as recited in claim 10, said planting implement including:

(a) a pair of folding extension units pivotly mounted on the opposing ends of said tool bar frame, said folding units each having a first arm pivotly attached to a second arm;

(b) a plurality of planter seed units mounted on the second arm of said folding extension units; and (c) means for articulating the first and second arms of said folding units into a wide planting array so that the first arm extends outward in a linear fashion from the ends of said tool bar frame with the second arm fully retracted against and parallel with the first arm, and into a narrow planting or transporting array so that the second arm is positioned at an acute angle with the first arm and the first arm is moved inward at an acute angle with the tool bar frame.

12. A planting implement as recited in claim 1, including a plurality of vertical drops for mounting said planter seed units to said tool bar frame, each vertical drop having an upper end connected to said tool bar frame and a lower end connected to the planter seed unit.

13. A push driven planting implement for mounting onto the front of a combine in place of a detachable grain head, the combine including a frame and a throat portion extending forward of the frame, said planting implement comprising:

(a) a tool bar frame for positioning around a throat of a combine, said tool bar frame having a horizontal, U-shaped center tool bar and a pair of side tool bars extending perpendicularly and horizontally from each end of the U-shaped center tool bar, said side tool bars creating opposing frame ends;

(b) an upper mounting member with opposing ends, one end of said upper mounting member is pivotly connected to said tool bar frame, the other end of said upper mounting member pivotly fixed to a combine frame of said combine;

(c) two lower mounting members and a hydraulic positioning system, said lower mounting members extending from said tool bar frame to the hydraulic positioning system mounted on the combine frame so that the hydraulic positioning system when activated or deactivated raises or lowers the tool bar frame, said tool bar frame being positioned forwardly of and spaced apart from the throat of the combine;

(d) a pair of folding extension units pivotly mounted on each opposing end of the tool bar frame, said folding units each having a first arm pivotly attached to a second arm;

(e) six planter seed units mounted onto said tool bar frame, said planter seed units mounted to provide thirty inch row spacings;

(f) three planter seed units mounted onto said second arm of each folding extension unit, said planter seed units mounted to provide thirty inch row spacings;

(g) an extension frame centrally positioned and mounted onto said tool bar frame, said extension frame capable of holding an optional thirteenth planter seed unit; and (h) a means for articulating the first and second arms of said folding extension units into a twelve row thirty inch planting pattern so that the first arm extends outward in a linear fashion from the ends of said tool bar frame with the second arm fully retracted against and parallel with the first arm, and into a full thirteen row fifteen inch planting pattern, when the optional thirteenth planter seed unit is attached to said extension frame, so that the second arm is positioned at an acute angle with the first arm and the first arm is moved inward at an acute angle with the tool bar frame so that the second arms overlay said extension frame and the three units on each of said second arms are positioned in front of and between the planting seed units on said base frame.

14. A planting implement as recited in claim 13, including at least one large hopper mounted on the tool bar frame and an air conveying system connected between said planter seed units and said hopper.

15. A planting implement as recited in claim 13, including an air conveying system connected to said planter seed units and extending to a grain storage bin of said combine, said grain storage bin holding seeds for conveyance to said planter seed units.

16. A push driven planting implement for mounting onto the front of a combine in place of a detachable grain head, the combine including a frame and a throat portion extending forward of the frame, said planting implement comprising:

(a) a tool bar frame;

(b) an upper mounting member with opposing ends, one end of said upper mounting member is pivotly connected to said tool bar frame, the other end of said upper mounting member pivotly fixed to a combine frame of a combine;

(c) two lower mounting members and a hydraulic positioning system, said lower mounting members extending from said tool bar frame to the hydraulic positioning system mounted on the combine frame so that the hydraulic positioning system when activated or deactivated raises or lowers the tool bar frame, said tool bar frame being positioned forwardly of and spaced apart from a throat of the combine;

(d) a pair of folding extension units pivotly mounted on each opposing end of the tool bar frame, said folding units each having a first arm pivotly attached to a second arm;

(e) a plurality of planter seed units mounted onto said tool bar frame;

(f) a plurality of planter seed units mounted onto said second arm of each folding extension unit; and (g) means for articulating the first and second arms of said folding extension units into a wide planting array so that the first arm extends outward in a linear fashion from the ends of said tool bar frame with the second arm fully retracted against and parallel with the first arm, and into a narrow planting or transporting array so that the second arm is positioned at an acute angle with the first arm and the first arm is moved inward at an acute angle with the tool bar frame.

\* \* \* \* \*